Oct. 1, 1940.  H. A. W. WOOD  2,216,286
WEB SPLICING DEVICE
Filed Oct. 27, 1937  11 Sheets-Sheet 3

Fig. 5.

Inventor
Henry A. Wise Wood
By attorney

Oct. 1, 1940.   H. A. W. WOOD   2,216,286
WEB SPLICING DEVICE
Filed Oct. 27, 1937   11 Sheets-Sheet 4

Fig. 6.

Inventor:
Henry A. Wise Wood
by attorney

Inventor
Henry A. Wise Wood

Oct. 1, 1940.  H. A. W. WOOD  2,216,286
WEB SPLICING DEVICE
Filed Oct. 27, 1937  11 Sheets-Sheet 11

Patented Oct. 1, 1940

2,216,286

UNITED STATES PATENT OFFICE 2,216,286

WEB SPLICING DEVICE

Henry A. Wise Wood, New York, N. Y.; Elizabeth Ogden Wood, executrix of said Henry A. Wise Wood, deceased, assignor to Wood Newspaper Machinery Corporation, Plainfield, N. J., a corporation of Virginia Application October 27, 1937, Serial No. 171,189

3 Claims. (Cl. 242—58)

This invention relates to a triple paper roll magazine reel for a printing press in combination with a full speed paper splicer for splicing the paper from an exhausted roll to that of a fresh roll to feed it into a printing press.

The principal objects of the invention are to secure ease and exactness of operation; to secure low cost of manufacture and maintenance; to provide a device which will feed a continuous web of paper to a printing press, or a similar machine, by splicing new rolls of paper to the expiring butts while the press is running at normal printing speed, thereby saving time by the elimination of the stops of the press for paper changes and being able to run the press continuously at its best printing speed; to provide means for facilitating the moving of the roll rotating belt arm into and out of operative position; to provide automatic mechanism for moving the fresh roll which can be used to take the place of the hand operation after the paster has been made; to provide a hand lever with a crank that locks past the center of a rod to place the paster arm in proper position for starting the pasting operation; to provide a brush mechanism in which the brushes are carried by levers on a shaft and means are provided whereby the paster mechanism is locked in a position close to, but separated from, the running web; to provide brush and knife mechanisms working together in which the brushes are mounted on levers held in operative position by solenoids and released to jump forward by other mechanism; to provide means whereby, when the paster arm is moved back to inoperative position, a crank action will be developed which will bring the brush lever stop into action; to hold out of action any brushes that are not needed when using splicing rolls of less than full width; to provide suitable and simple means for operating the knife for cutting the web; to provide simple means for limiting the motion of the knife; to provide a solenoid or equivalent means for releasing the knife together with other means for operating it to cut the web; to provide means for automatically resetting the knife in inoperative position; to provide means whereby the knife solenoid will operate approximately three-quarters of a revolution of the fresh roll after the brush has pressed the running web against it and the web has been severed; to provide a modification in which the change speed device can be eliminated, and to provide a three roll reel uncomplicated by any special splicing means.

Other objects and advantages of this invention will appear hereinafter.

Reference is to be had to the accompanying drawings, in which.

Figures 18, 19, 20:
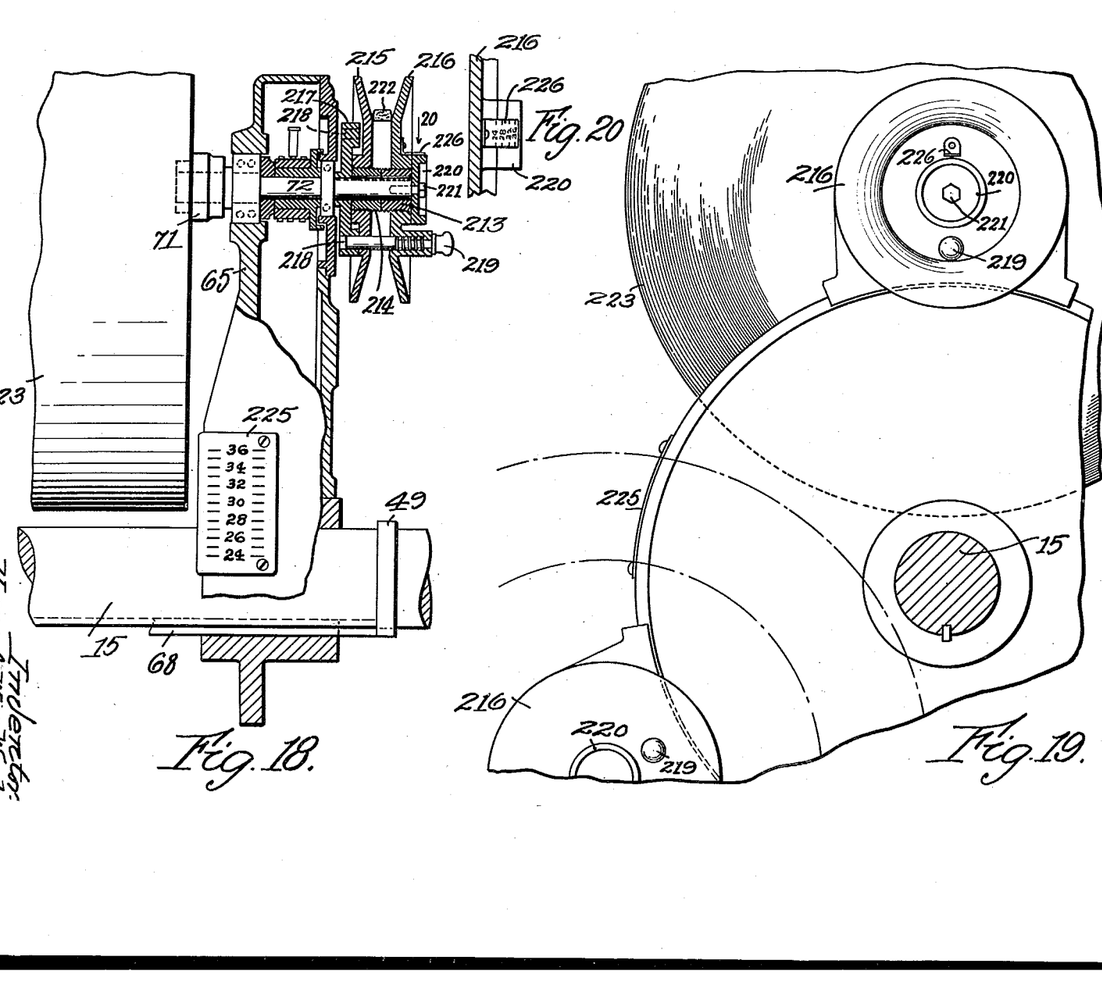
Fig. 18 is a central longitudinal sectional view showing the mechanism modified to the extent of eliminating the change speed device.
Fig. 19 is an end view of the same looking in the direction of the arrow 20 in Fig. 19.
Fig. 20 is a detailed view showing the method of holding a graduated scale.

This invention is presented in two main forms and a subsidiary form. One of the main forms, but not the preferred one, is arranged for operation when no high speed pasting is done in connection with the reel. This is shown in the first four figures. The preferred form with the pasting is shown in Figs. 5 to 17 inclusive. The subsidiary form is shown in Figs. 18 to 20 inclusive.

The first of the above mentioned forms will be described first. It involves a three armed reel for holding and moving three rolls but shows no pasting means. However, its description will prepare the way to the understanding of the main invention as it constitutes a reel of the same general character as the main form of the invention, uncomplicated with a pasting means, yet, of course, it can be used with a splicing means, preferably a single one.

Figure 2:
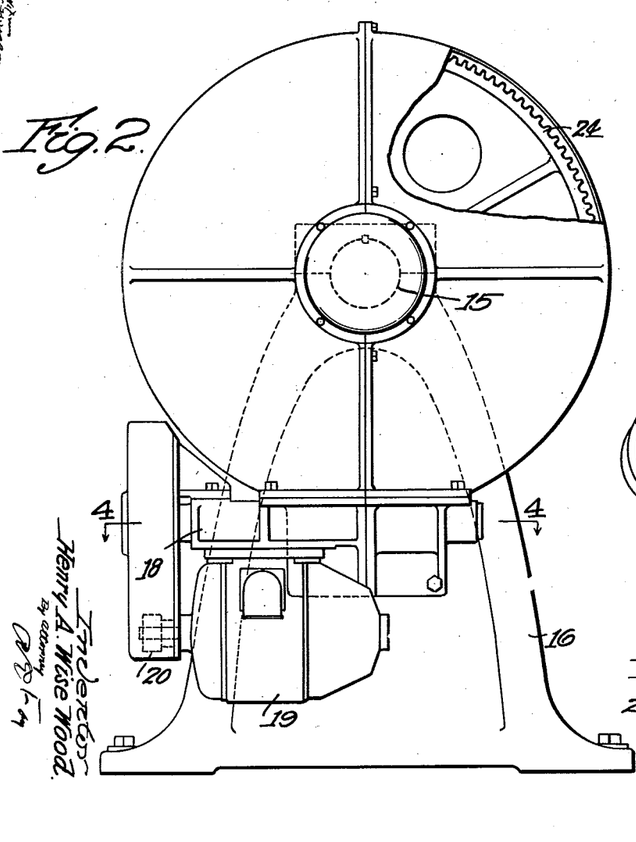
Fig. 2 is an end view of the same, as indicated by the arrow 2 in Fig. 1, showing the revolving mechanism.
Figures 3, 4:
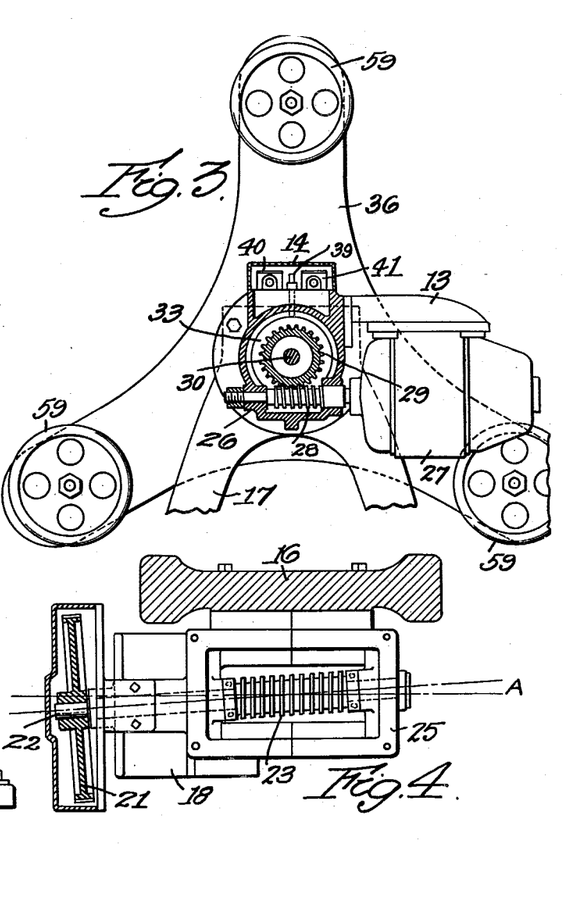
Fig. 3 is an end view of the reel, looking in the direction of the arrow 3 in Fig. 1, partly in section showing side adjusting mechanism.
Fig. 4 is a sectional view on the line 4—4 of Fig. 2 showing the drive worm for revolving the reel.

Looking especially at Figs. 2 to 4, a reel support shaft 15 is revolvably fitted to pedestals 16 and 17. The pedestals are fastened to the floor by screws. Connected to the pedestal 16 is mounted a reversible motor 19 on the shaft of which is mounted a pinion 20. This pinion engages with a gear 21 which is keyed to the end of a worm shaft 22. This shaft is an integral part of a worm 23 which engages a large worm gear 24 which is keyed to the end of the shaft 15. As will later be explained the shaft 15 is adjustable endwise. To make this possible the teeth of the worm wheel 24 are made straight, the same as a spur gear. It will be understood that angular teeth on a worm gear would otherwise have interfered with end motion in the contacting worm 23. To make the threads on the worm 23 match the straight teeth on the worm gear 24 the center of the worm is placed out of parallel with the center of the motor 19 and of the face of the worm gear 24, see Fig. 4. The angle "A", of course, is the same as the pitch of the worm tooth. The worm 23 rotates in bearings in a guard 25. This guard also has a shelf 18 on which the motor 19 is mounted. The guard is securely fastened to the pedestal 16.

From this description it will now be understood that, when it is required to revolve the support shaft 15 in either direction, this can be accomplished by pushing one of two electric contact buttons, one controlling the clockwise and the other the counterclockwise motion of the reel as driven by the motor 19. On the end of the reel adjacent to the pedestal 17 is located the end motion or "register" motion of the paper rolls. A combination bracket and guard 26 is fastened to the hub of the pedestal 17. On the shelf 13 on this guard is fastened a reversible motor 27 on the shaft of which is a worm 28, the outer end of which is carried in a bearing in the guard 26. This worm engages with the face of a worm gear 29 which is securely fastened to a screw 30. The outer end of the screw 30 screws into a fixed nut 31. This nut is fastened to the outside end of the guard 26 and kept from motion by screws 32. The other end of the screw 30 is revolvably fitted in a collar 33, but kept from end motion by the head 34 on the screw. The collar 33 is securely fastened to the end of the support shaft 15.

It will now be understood that when it is required to move the shaft 15 endwise and thereby the spiders 35 and 36 which are secured to the shaft 15 and mount paper rolls, it will be necessary only to push one of the two electric control buttons (not shown) for the motor 27. One controls right hand, and the other left hand, rotation of the motor. The motor will revolve the worm 28 which will in turn revolve the gear 29. The gear 29, being fastened to the screw 30, will cause the same to screw into or out of the nut 31, as the requirement may be, thereby pulling or pushing shaft 15 endwise by the screw which is connected to the shaft 15 by the collar 33.

To prevent the end motion in either direction from exceeding a predetermined limit, the outside surface 37 of the collar 33 is made with a conical shape in both directions. At a fixed distance on both sides of the center position of the motion of collar 33 are located two plungers 38 and 39. These plungers loosely fit in sockets in the guard 26. The lower ends of the plungers are long enough to contact with the conical face of the collar 33. The upper ends of the plungers are enlarged enough to prevent them from dropping down beyond a certain limit. In an enclosed case 14 at the top of the plungers 38 and 39 are placed two limit switches 40 and 41 which are controlled by the motion of rolls 42 and 43 which are mounted on levers on the switches. These rolls rest on top of the plungers 38 and 39 respectively. As the collar 33 has moved endwise far enough for the face 37 to engage with the plungers 38 or 39, as the case may be, the corresponding plunger will be pushed out, and will operate its respective limit switch. The limit switches are so connected that they will shut off the power preventing further motion of the motor 27 in the direction concerned.

On the spider support shaft 15 are located the two spiders 35 and 36. The spiders have three positions for paper rolls, as indicated in Fig. 3. Each of the three arms on the spiders is equipped with paper cones 55 and 44 which fit the cores in the paper rolls and act as centers when the rolls revolve.

The paper roll cones 44 in the spider 35 are mounted on ball bearings 45. The inside race of each bearing is securely held on studs 46 which are held in hubs 47 of the spider 35. This stud is secured to the spider hub by a screw 48. The reason for the large diameter of the stud 46 will later be explained. There are three spider arms on each spider and they are all fitted up in the same way.

On the spider support shaft 15 are indicated the two collars 49. These collars are located on the support shaft in the extreme position where the respective spiders may be moved without interfering with the pedestals when the reel is rotated. The two spiders 35 and 36 are both slidably mounted with respect to the shaft 15 but are kept from rotating with respect to the shaft by their respective sliding keys 50 and 51 which slide in a keyway 12 that runs the full length of the shaft between the pedestals. The two spiders may be shifted to any position between the collars 49 on the shaft 15 to suit the length and position of the required paper rolls. When the correct position of spiders has been found screws 52 and 53 will be clamped up to securely fasten the spiders to the shaft. The screw 52 has a tit-end which enters a hole in the keys 50 and 51 respectively to prevent the keys from slipping out of the hub when moving the spider on the shaft.

When entering a roll of paper on the paper roll cones or when removing a butt from the same, it is necessary that the cone at one end of the roll be pushed back out of the way to make room for entering. To accomplish this fact, the cones 55 on the spider 36 have been made to pull back into the large holes in the hubs 57 in which the cone support studs 56 are located. The cones 55 on the spider 36 are identical with the cones 44 on the spider 35. They are mounted on a double row ball bearing of which the inner race is centered on the stud 56 which is slidably mounted in holes in the hubs 57 of the spider. In a threaded groove in the stud 56 is located a screw 58 which extends to the outside where it mounts a hand wheel 59. The screw has a splined projection at the other end by which it is splined to the hub of the hand wheel. This screw is loose to turn in the groove in the stud 56 but is kept from end motion by a collar 60 which is screwed to the end of the stud 56 and the screw fits into a groove 64 formed by the hub of the hand wheel 59 and a washer 61. The screw engages with a screw threaded poppet 62 which is fastened to the spider hub by a tit on the poppet being pushed into a hole 66 on the inside of the hole in the hub 57. A screw 63 in a slot 64 limits the end motion of the stud 56 in either direction.

From this description of the simplest form of the invention, without splicing means, it will be understood that when required to pull a cone 55 back and out of the way to enter or remove a paper roll or core, it is necessary only to revolve the hand wheel 59 which will result in that the paper cone will be pulled into the large hole in the hub by the action of the screw 58 and nut 62. The reason for the large hole for the stud 46 in the hub 47 of the spider 35 is only to make this spider interchangeable with the spider 36, as at times it may be necessary to reverse the location of the two cones 44 and 55.

Figure 5:
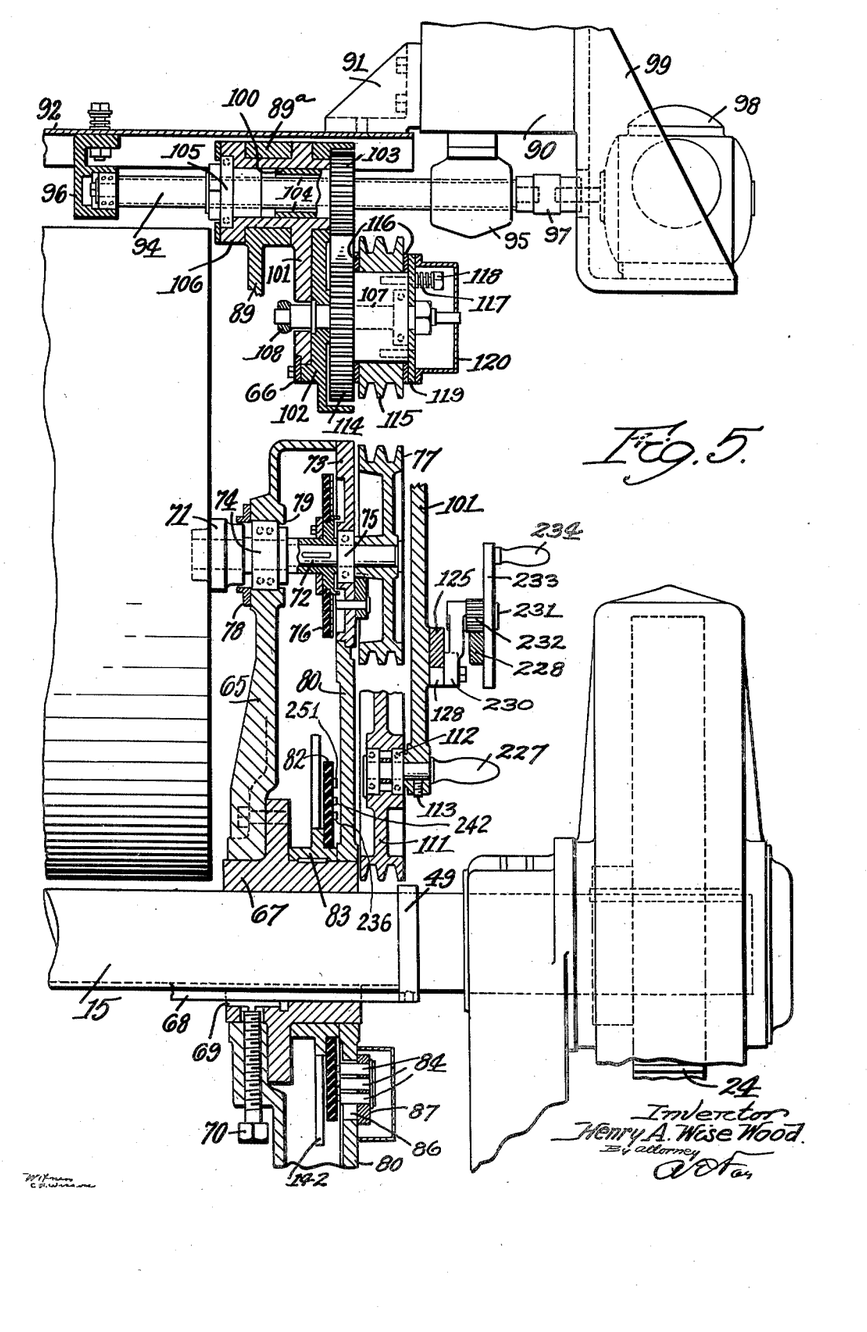
Fig. 5 is a view, from the side opposite that shown in Fig. 3, partly in section on the line 5—5 in Fig. 6, of a modification of the device shown in Fig. 1 showing the drive for the rolls in the preferred form of the invention.

In the following will be described the arrangements of the reel and paster mechanism combined, constituting the preferred form of the invention:

When the reel is to be used with a paster, the spider 35 is replaced by another spider 65 (see Fig. 5). This spider has three arms like the other spiders 35 and 36 and is made in the shape of a box for the reason that it may enclose the different cams, contact discs, etc. belonging to the mechanism. It is bolted to a hub 67 which is slidably fitted to the shaft 15 but kept from rotating on that shaft by a key 68 which runs the total length of the keyway between the limit collars 49. A saddle key 69 will lock the spider in any desired position by a jamming screw 70.

Paper roll cones 71 in one spider, cooperating with the cones 55 on the opposite spider, are keyed to the shafts 72. All three of these shafts each revolve in two ball bearings 74 and 75. The bearing 74 is located in the hub of the spider 65 next to the cone 71. The other bearing 75 on the shaft 72 is located in a cover plate 73 which is securely screwed to the spider 65. Keyed to the shaft 72 and located in the enclosure formed by the spider arm 65 and cover 73 is located a commutator disc 76, the purpose of which will be later explained. On the outside end of the shaft 72 is keyed a double V-pulley 77. This pulley will also be explained further on. It will be noticed that the cone 71 is held against end motion in both directions by the ball bearings 74, which is locked in both directions by a collar 78, on the inside, and a lip 79 on the spider hub, on the outside. The large center portion of the box shaped body of the spider 65 is covered by a circular plate 80. The covers 73 and 80 are cross hatched in different ways. The outside rim of this plate is turned to match the inside edges of the cover plate 73, which also is finished and acts as a centering rest for the shaft 72. The hole on the non-rotatable plate 80 is made to fit freely on the outside of the hub 67 thereby keeping the plate true with the center of the reel. The plate is kept from rotation by a bracket 81 which is bolted to the side of the plate. Inside of the enclosure formed by the center portion of the spider 65 and the plate 80 is located a commutator plate 82 which is carried on a hub 83. The hub 83 is keyed to the hub 67 of the spider 65 and turns with the same. Three contact brushes 84 which connect with bus bars 236, 242 and 251 respectively on the commutator 82 are located in a hole 86 in the plate 80, where they are supported by an insulated holder 87, which is fastened to a shelf 88. The purpose of the commutator will be later explained in the description of the wiring diagram. The bracket 81 extends upwards to approximately the total length of a spider arm and at this point it forms the shelf 88 (see Fig. 8) on which is bolted a bracket 89.

Between two press substructure beams 90 is suspended, with flanges pointing downwards, a channel iron 92 (see Fig. 5). It is fastened to the beams by brackets 91 which bolt to the beams 90 as well as the channel 92. The bracket 89 extends up to the channel 92 where it forms two lips 93 (see Fig. 7), which slide against the sides of the channel, keeping the brackets 89, and in turn the bracket 81, from rotating in either direction. Centrally located with respect to the channel 92 and just below it is a splined shaft 94. The outer end of this shaft is supported in a pillow block 95, fastened to the bottom of the substructure beam 90. The other end is supported in a ball bearing in a bracket 96 which is fastened to the channel 92 a slight distance beyond the center of the channel bar. The outer end of this shaft 94 is connected by a coupling 97 to the output shaft of a variable speed device 98. The input shaft of this speed device is driven from the press at a speed proportional to the printing speed of the press. The speed device 98 is fastened to an L-shaped bracket 99 which fastens to the press substructure beam 90.

The bracket 89 is so made that it forms a sleeve 89a at its upper end which acts as a bearing for the assembly of a sleeve 100, pulley arm 101 and pulley arm 102. These two pulley arms are held together by a guide 66. The sleeve 100, which is an integral part of a gear 103, has a sliding fit on the shaft 94. It is kept from turning on that shaft by two keys 104 which slidably fit in keyways in the shaft. At the end of the sleeve 100, opposite to gear end 103, is clamped a ball bearing 105 of which the outer sleeve is countersunk into the end of a paster arm hub 106. As the roll driving arm is supported by swiveling its supporting shaft 94 in the sleeve 89a, this ball bearing's only purpose is to keep the center of the shaft 94 central with the center of a hole in the sleeve 89a and more or less act as a steady rest for the shaft. The gear 103 engages with a gear 114 which revolves on a stud 107. The stud 107 is securely clamped to the pulley arm 102. Looking at Fig. 5 this stud has an extension on the left end which extends through a slotted hole in the pulley arm 101 and at this point is pivoted the spring rod 108. See Fig. 7. A spring 235 on this rod 108 pressing between a spring rod poppet 109 which is fastened to the pulley arm 101 and a collar 110 on a spring rod, tends to force the lever 102 to the right as looking at Fig. 7. Looking at Fig. 5, a double face V pulley 115 is located on the hub of the gear 114. This would be free to turn on the hub of the gear except that it is held from revolving by the friction of two discs 116 which clamp the pulley to the gear by the action of several springs 117 and studs 118 which press against the washer 119. The cup 120 is a guard which keeps dirt out of the inside mechanism.

At the lower end of the pulley arm 101 is located a pulley 111 which revolves on ball bearings 112. The stud for these ball bearings goes through a hole in the pulley arm 101 where it is securely fastened with a set screw 113. A continuation of the stud is made into a handle 227 for assistance in operating pulley arms 101 and 102.

Two endless double V belts 121 (see Fig. 6), are attached around pulleys 115 and 111. It will be understood that the action of the spring rod 108, spring 235 and poppet 109 will tend to tighten the belt. The double V pulleys 77 on each of the paper roll spindles are in direct side alignment with the two pulleys 111 and 115, and it will be understood that if the back side of the belt 121 is made to contact with the pulley 77 on one paper roll spindle it will tend to revolve the respective paper roll cone, and in turn the paper roll which may be carried in this spider arm.

To facilitate moving of the pulley arm 101, which operation is quite heavy, the following mechanism is used:

A rack 228 (see Fig. 9) has the same curvature as the bar 125, the radial centers of which are located at 94. The rack 228 is fastened at one end to a stud 126 and the other end is fastened to a bracket 229 which is fastened to the side of the bracket 81. Outside of the bracket 128 on the arm 101 is bolted another bracket 230 which carries a gear stud 231. On this stud is located a gear 232 which is securely connected to a hand wheel 233. The gear and hand wheel are free to turn on the stud. The stud is located in such position as to place the gear 232 in correct mesh with the rack 228. It will now be understood readily that by turning the hand wheel, which for facility's sake is provided with a cranking handle 234, either to the right or to the left, the gear 232 meshing with the rack 228 will bring the pulley 111 to any position required.

Figure 6:
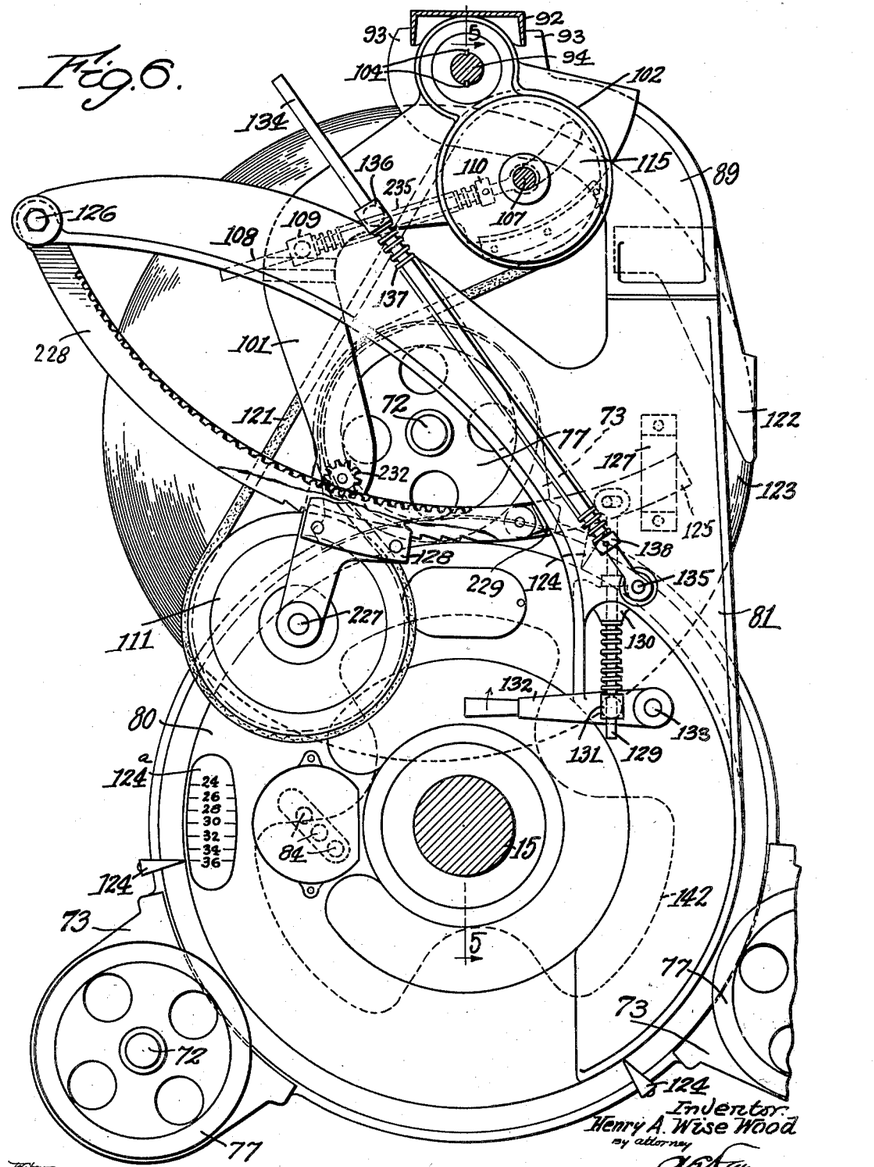
Fig. 6 is an end view of the reel showing the driving mechanism for the rolls.

When making a paster it is necessary that the new paper roll, which is to be spliced to the paper coming from the expiring butt, must be revolved at approximately the same surface speed as the web is traveling. To accomplish this it is necessary to measure the diameter of the new roll as, of course, the revolutions of the roll must change in proportion to the diameter. The measuring device is as follows:

In Fig. 6, a plate 122 is fastened to the bracket 89 outside of the end of the paper roll 123. The paper roll 123 is now moved around the center of the shaft 15 until the side of the paper roll lines up with the side of the plate 122. On the side of the reel body 65 on the left side of each spindle position are fastened three pointers 124. These pointers will, of course, revolve with the body of the reel as the reel revolves around the center of the shaft. It will be understood that one pointer will find a certain position on the fixed cover 80 according to the size of the paper roll. A plate 124a is fastened to the fixed cover 80. This plate 124a is graduated from 24 inches to 36 inches, in this case, these graduations being predetermined to indicate the diameter of the paper roll. As the pointer 124 points to a certain number, the operator of the reel will read the indicated diameter on the scale 124a. The speed indicator 144, Fig. 15, on the variable speed device 98, Fig. 5, will then be adjusted according to the indicated reading. The resulting surface speed of the new roll will, when the belt 121 is brought into contact with the pulley 77, be the same as the printing speed of paper.

In Fig. 6 the pulley arm 101 is shown in the right position when driving the paper roll 123. It is held in this position by the ratchet teeth on a curved bar 125 which pivots at 126 and at the other end is held from side motion by a bracket 127. A spring rod 134 pivots on a stud 135 in bracket 81 and extends through a swivel poppet 136 which is fastened to the belt arm 101. A spring 137 on this rod, pushing between the poppet 136 and a collar 138, tends to push the belt arm upwards to disengage the belts 121 from the pulley 77 in use at that time. The curve of the bar 125 is concentric with the center of the shaft 94.

The bracket 127 will allow the bar 125 to move vertically enough to disengage its ratchet teeth from the teeth in ratchet block 128 which is fastened to the pulley arm 101 and which has teeth that match the teeth in the bar 125.

On the bar 125 adjacent to the bracket 127 is loosely fitted the head of a spring rod 129. This spring rod extends through a poppet 130 which is a lug on the bracket 81. Its other end is screw threaded and screws into a swivel poppet 131 fastened to a lever 132. The lever 132 pivots on a shaft 133.

From this arrangement it will be seen readily that, by raising the handle and lever 132, the bar 125 in turn is lifted upwards. In so doing the ratchet teeth on the bar are lifted clear of the teeth on the ratchet block 128. The spring 137 on the spring rod 134 will now act to swing the pulley arm 101 upwards and the belt 121 will be disengaged from the paper roll driving pulley 77.

Figures 7, 8, 9:
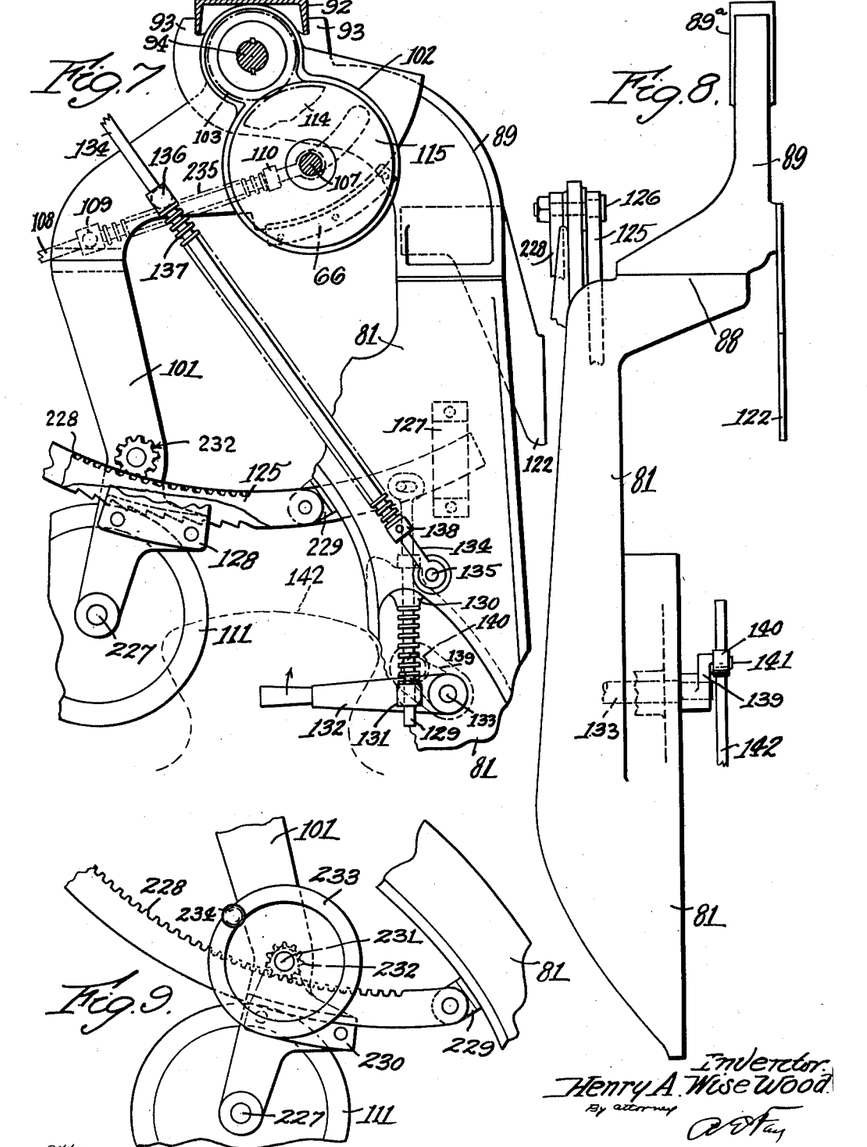
Fig. 7 is a sectional view of parts shown in Fig. 5.
Fig. 8 is a side view of the bracket for supporting the roll driving mechanism.
Fig. 9 shows one embodiment of a device for lowering and raising the roll driving mechanism.

An automatic mechanism takes the place of this hand operation after the paster has been made. The mechanism thereof is as follows:

On the shaft 133, see Fig. 8, inside the housing, is located a crank 139. On the end of this crank is located a roller 140, which pivots on a stud 141 fastened to crank. On the hub 83, and made integral therewith, is located a triple lobed cam 142. One cam projection corresponds to each of the three paper roll positions of the reel. This cam has the same side alignments as the roller 140 and its outer surface will interfere with this roller when the reel is revolved far enough for the cam to reach it. As the reel is rotated the cam will raise the roller 140; this will cause the shaft 133 to turn, causing the spring rod 129 to lift the bar 125. The ratchet teeth will release the pulley arm 101. The arm will rise and cause the belts 121 to be disengaged from the paper spindle pulley 77. By revolving the reel further the cam 142 will again release the roll 140. The belts 121 may again be lowered and latched in position, if so required.

Figure 10:
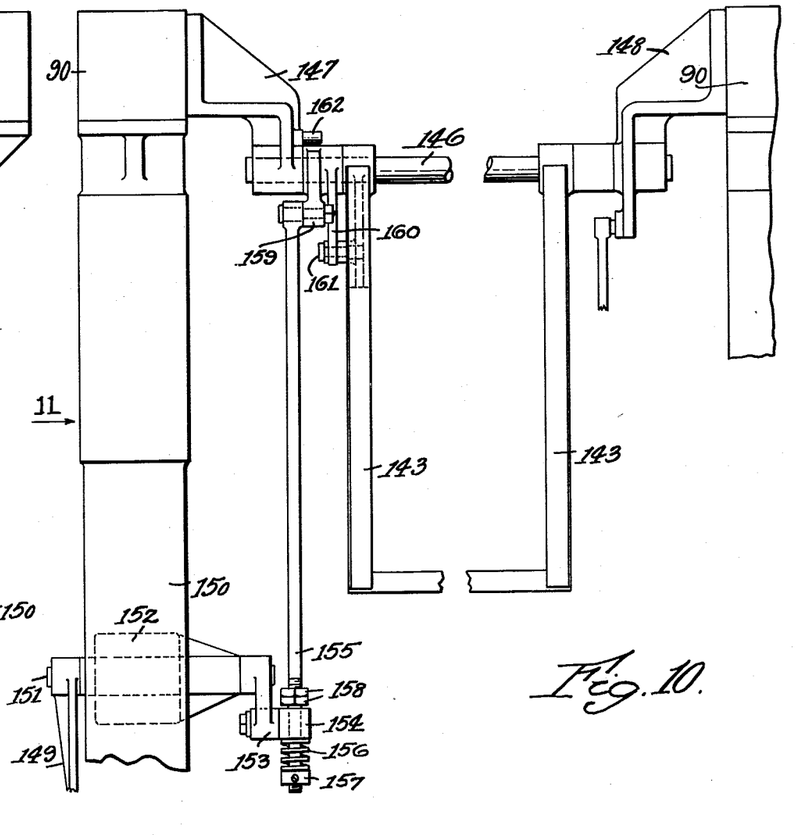
Fig. 10 is a side view of the paster arm operating mechanism.
Figure 15:
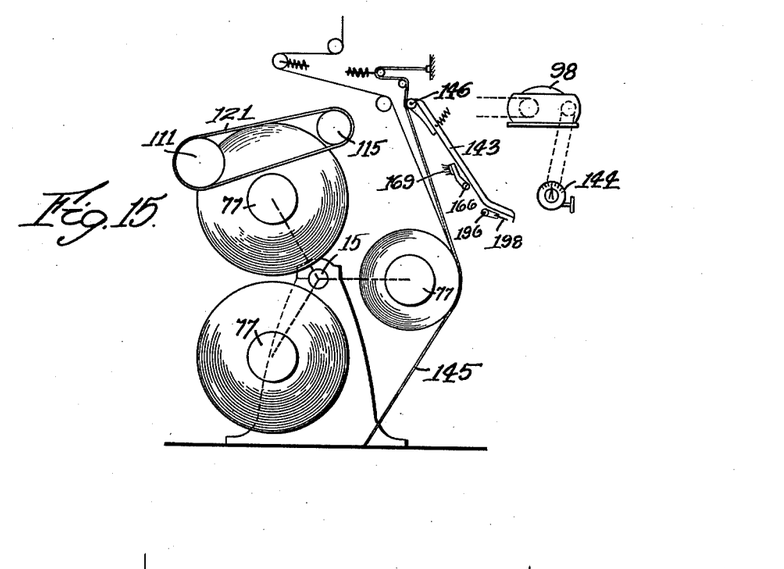
Fig. 15 is an end view of the reel and paster, showing the paper roll in running position.

Looking at Fig. 15 the paster arm frame 143 is located outside of tension belts 145 and mounted on a shaft 146. This shaft is oscillatably carried in brackets 147 and 148, see Fig. 10, which are fastened to the substructure beams 90. The paster arm 143 is operated into and out of operating position by a crank arm 149. The crank may be mounted in any convenient way, as for example, as shown in Fig. 10, by bracket to the press support column 150. The operating mechanism is as follows:

The operating hand lever 149 is secured to a shaft 151, which is free to turn in a bracket 152. This bracket is fastened to a column 150. On the other end of the shaft 151 is located a crank 153 in which outside hub swivels a poppet 154. Through the hole in this poppet extends a rod 155 which is held in the right position by a spring 156 pushing between a collar 157 and the poppet 154 in one direction and the two jam nuts 158 acting as stops, locating it in the other direction. The upper end of the rod 155 is loosely connected to a crank 159 which is loose to turn on the paster arm support shaft 146. Another arm 160 which forms an integral part of lever 159 is fastened to the paster arm frame 143, as by a shear pin 161.

It will now be understood that bringing the hand lever 149 downwards until the crank 153 locks past center, the rod 155 will be pulled downwards to a predetermined position. This position will place the paster arm 143 in pasting position by being moved by the double lever 159 and 160. By bringing the hand lever 149 upwards, until the crank 153 has moved approximately 180 degrees, the paster arm frame 143 will be unlocked and brought to idle position.

A stop pin 162, which is driven into a lug on the bracket 147, acts as a stop for the paster arm frame 143, in both directions. In pasting position it strikes against a screw 163 which is adjustably mounted in a lug 164 which is an integral part of the same casting as the levers 159 and 160. When the paster arm 143 is in inoperative position, the pin 162 contacts with a lip 165 on the same casting.

Figure 11:
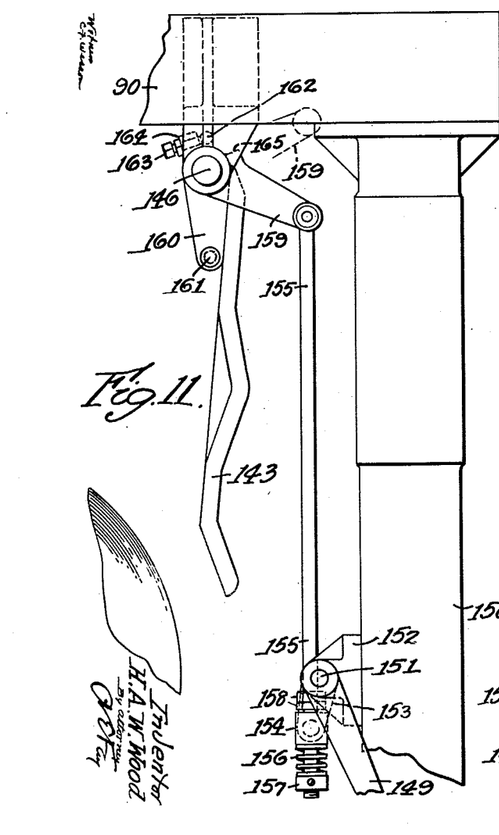
Fig. 11 is an end view of the paster arm operating mechanism.

The dotted position of the lever 159, see Fig. 11, shows it as in the inoperative while the full line shows the pasting position of the paster arm frame 143. Looking at Figs. 12 and 13, the paster arm 143 is a frame made up of several lengthwise and crosswise members. As previously mentioned it is supported on the shaft 146.

When preparing to make a paster it is required that the brush 169, in locked position, must stop at a fixed distance from the surface of the new paper roll. At the moment a paster is made, a solenoid 206 which controls the operation of the brush is energized by pushing an electric contact button 259. The solenoid will then release the brush mechanism, the brush will jump forward, as will appear, and press the paper coming from the butt against the surface of the new roll. This roll has previously been prepared for pasting by the application of paste to the edges of the end of the outside layer of paper. The paper from the old and the new roll will now stick together. At a fixed time after the paster is made a knife 198 will drop in the path of the paper coming from the butt and will sever the same. The paper from the new roll will then continue to feed the press.

The mechanism for locating the paster arm frame 143 in pasting and inoperative positions respectively has already been explained. The following will explain the brush and knife mechanism. Across the paster arm frame 143 is located a shaft 166, see Fig. 12. This shaft is free to turn in bearings 167 a, b, c, d, e and f, which are integral with the paster arm. On this shaft are mounted a number of levers 168 which are securely fastened to the shaft. Each of these levers carries one of the brushes or pasters 169 which are screwed to the flat faces of the levers 168.

Adjacent to bearings 167 b, c, d and e are located levers 170. These levers are securely fastened to the shaft 166. In the outside hub of each of these levers is located a poppet 171 which has a swivel fit in the hub and has an elongated hole through which passes a spring rod 172 in each case. These spring rods are guided in brackets 174 which are fastened to the paster arm frame 143. Near the top of each rod 172 is adjustably located a collar 175. Located on each rod, and pushing between the collar 175 and a poppet 173, is located a push spring 176 which urges the rod in an upward direction. Pushing against the bottom of the poppet 171 is securely fastened to the rod 172 a collar 177. It will now be understood from this arrangement, that if the brush was free to move the springs 176 acting in combination with the rod 172, the collar 177 and the lever 170, would make the brush move forward. It is prevented from doing so, however, by a stop 178 on a solenoid lever 179 interfering with a stop 180 on the brush holder 168, see Fig. 13. The brush or paster will jump forward when the solenoid 206 is energized and a solenoid plunger 181 raises the lever 179 releasing the stop 180.

This solenoid 206, as well as a solenoid 207 for operating the knife, which will be explained later, is located in a box 182 fastened to the paster arm frame 143. After the paster has been made and the brush is in released position it will be automatically reset when the paster arm is brought back to inoperative position.

Figure 12:
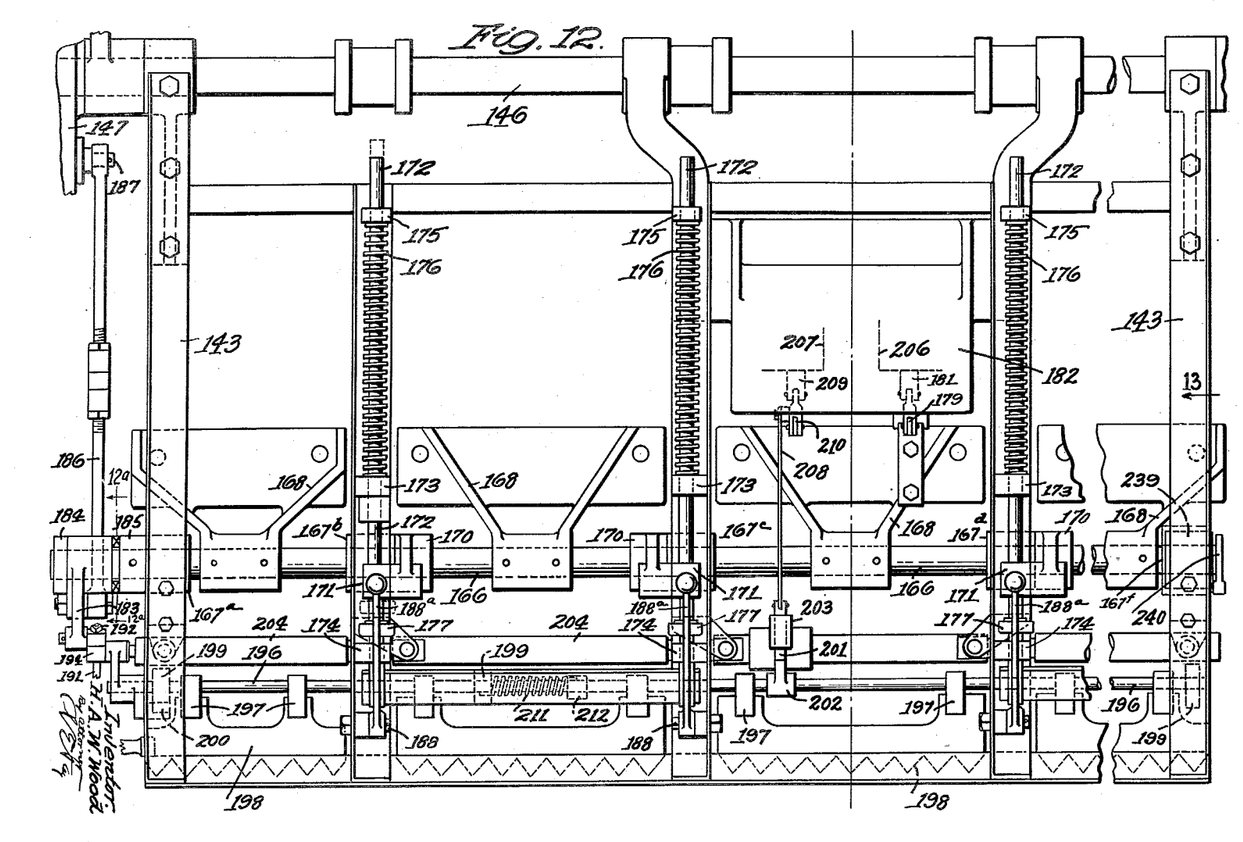
Fig. 12 is a front elevation of the paster arm and associated parts.

The brush lever support shaft 166 extends outside of paster arm on one end, see Fig. 12. The resetting is accomplished by this mechanism. On this end is located a lever 183 which is loosely fitted on the shaft. It is kept from end motion by being located between an end collar 184 and clutch jaws on a back lash clutch 185. This clutch 185 is securely fastened to the shaft. The hub of the lever 183 has clutch jaws which co-act with those on the clutch 185. The jaws are so made, however, that they will not engage with each other until a large portion of the motion is exhausted. At the end of the lever 182 is pivotally fastened a connecting rod 186. The other end of this rod connects to a fixed stud 187 on the bracket 147.

Figures 12A, 13:
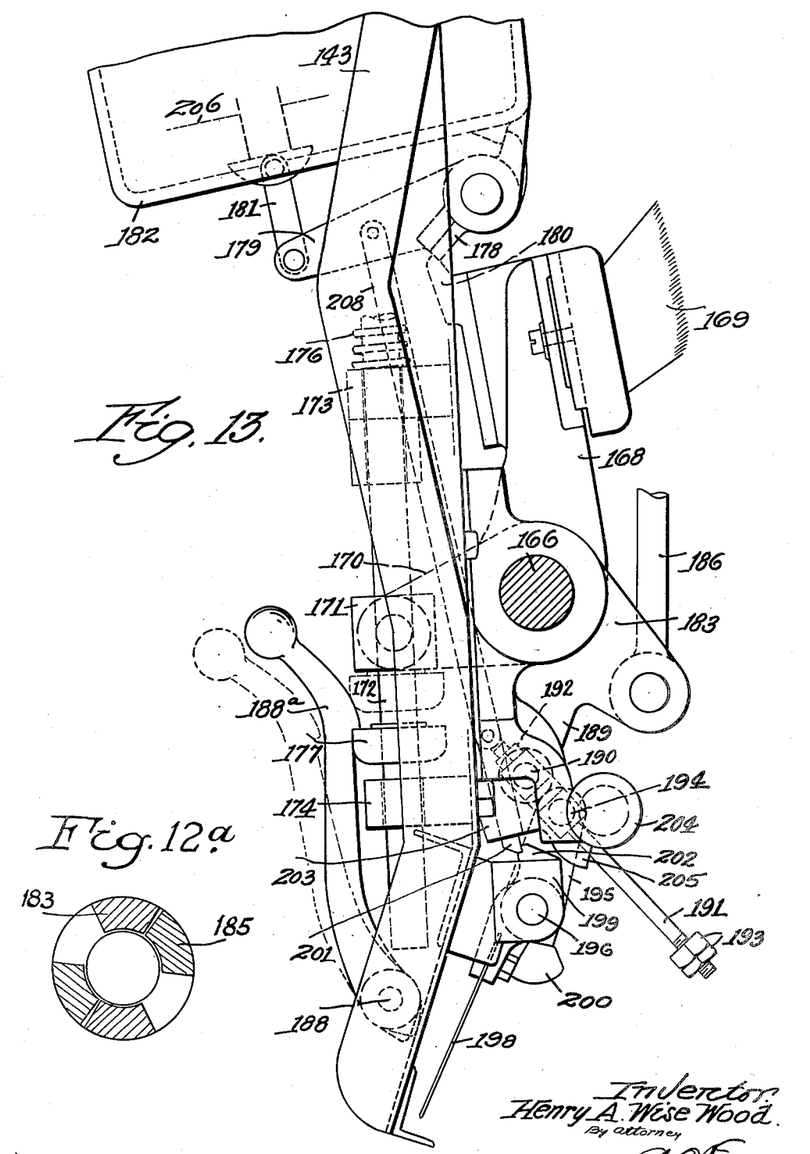
Fig. 12a is a sectional view on the line 12a—12a of Fig. 12, of the clutch jaws, of the clutch on the shaft in the lower left hand part of Fig. 12.
Fig. 13 is an end view of the paster arm and associated parts.

It will now be understood readily that when the paster arm is moved from pasting to inoperative position, a crank action is developed between the center of the shaft 146 and the center of the stud 187 which will pull the rod 186 upwards. This will in turn revolve the lever 183 until the lost motion in the clutch 185 is exhausted, when it will turn the shaft 166 and thereby bring the brush lever stop 180 into locking position with the solenoid lever stop 178. When pasting short rolls, as quarter length, half length and three-quarter length, when certain brushes do not contact with the surface of the paper roll, it is preferred to lock the operating springs on the idle brushes. For this purpose is used a pawl 188a which swings on a stud 188 fastened to the paster arm. When the paster arm is swung into inoperative position this pawl may be locked against the face of the collar 177 as shown in Fig. 13. The corresponding spring rod will thereby be inoperative as the spring will be locked in compressed position.

Integral with the lever 183 is another arm 189 in the hub of which is located a poppet 190. This popet is free to swivel in the hub of the lever. The hub in the poppet is screw threaded to receive a pin 191 which is locked securely to the poppet by a nut 192. At the free end of this pin are located two nuts 193 which are locked together and may be moved for adjustment.

The pin 191 enters a poppet 194 which is free to turn in a lever 195. This lever is securely fastened to the end of a shaft 196 which is the shaft that carries brackets 197 that are fastened to and support the knives 198. The shaft is supported in a series of brackets 199 which are fast to the paster arm. On the shaft 196 are located two torsion springs 211. One end of each is secured to one of the brackets 199 and the other end to a collar 212 which is set screwed to the shaft 196. These springs urge the knives 198 towards operating position. A stop 200 on the lever 195 will limit the motion of the knives 198 by contacting with the bracket 199 when the knives move into cutting position. The knives are prevented from swinging into operating position by a latch 201 interfering with a toe 202 which is secured to the knife support shaft 196. The latch 201 is slidably mounted in a bracket 203 which is fastened to a bar 204 which in turn is fastened to the paster arm 143 by brackets 205. The latch 201 is operated by said solenoid 207 which, when energized, will pull a plunger 209 upwards. The plunger is loosely fitted to a lever 210. To this lever in turn is loosely fastened one end of the connecting piece 208 of which the other end is fitted to the latch 201. The knife operating mechanism will now be readily understood. The solenoid 207 will be energized by an electric contact described later. The latch 201 will release the stop 202 and the springs 211 will swing the knives 198 until the stop 200 contacts with the bracket 199. The knives 198 will then be in operating position. The knives will be automatically reset when the paster arm 143 is brought back to inoperative position by the lever 189 pulling the lever 195 into latching position by the action of the connecting pin 191 and nuts 193.

Figure 14:
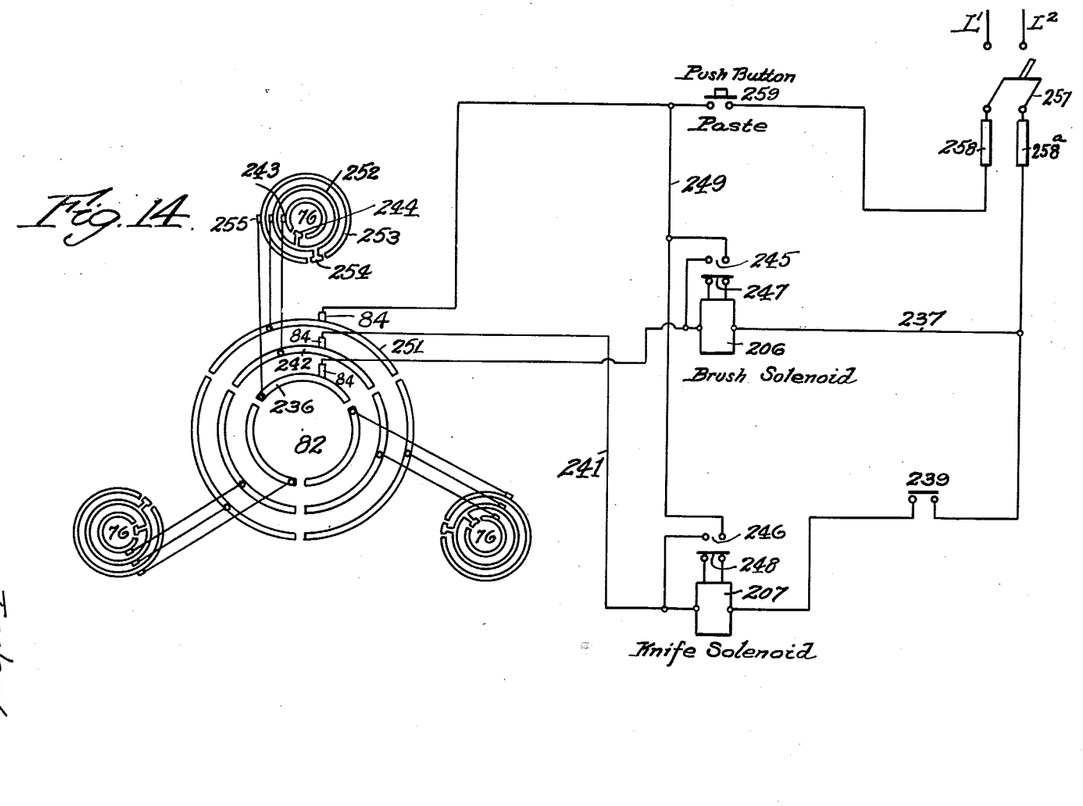
Fig. 14 is a wiring diagram of the preferred form.

The electrical equipment and control used for rotating the magazines reel and shifting for side register is well known in the art and it is considered unnecessary that it be described in detail. Referring particularly to Fig. 14, the wiring diagram is shown in simplified form for the equipment used in making the splice. Power is derived from lines L1 and L2 through a switch 257. As shown in Fig. 5, the insulated ring 82 mounts a series of selector rings which serve to connect the controls to the particular spindle carrying the fresh web roll. As shown on the wiring diagram, line L1, when the switch is closed, leads through a fuse 258 to a paste button 259 and from there to a brush 250 contacting a selector segment 251 which is connected to a commutator ring 252 of the commutator 76 carried on the spindle of the fresh web roll, and thereby brings one side of the power to that ring. A commutator ring 253 has a disconnected portion 254 which is electrically connected with the ring 252 in such a manner that at a particular point in the revolution of the fresh web roll, electric energy is supplied to a brush 255. This is true only when the paste button 259 is depressed. Electric energy is then transmitted to a selector segment 236 and from there to one side of the brush solenoid 206. The other side of the brush solenoid 206 is connected by line 237 to a fuse 258a and thereby becomes a closed circuit energizing the brush solenoid 206, permitting the brush to press the running web against the fresh roll. As this is done and the splice is accomplished, contacts are closed in a switch 239, shown also in Fig. 12, by the operation of a cam 240 carried on the end of the shaft 166. The closing of contacts in this switch 239 puts one side of the line on the knife solenoid 207, the other side of which is connected through a line 241 to a selector segment 242 which in turn is connected with a brush 243 in such a manner that, when a projection 244 passes under this brush, the other side of the line is connected to the solenoid 207 through the commutator ring 252, segment 251, brush 250 and paste button 259.

This means that the knife solenoid 207 will operate approximately three-quarters of a revolution of the fresh web roll after the brush has pressed the running web against the fresh roll, and thereby caused the knife to sever the old web. Hold-in contacts indicated generally by 245 and 246 respectively, serve to hold in brush solenoid 206 and knife solenoid 207, once these solenoids have operated. This is evident by the bars 247 and 248 respectively for closing the contacts to give a circuit from the side of each of the solenoids through a wire 249 and back through the paste button 259. So long as the paste button 259 is held depressed after splicing, these solenoids will be energized. The moment the paste button is released, both solenoids will be deenergized and will not operate again until the cycle above described is repeated.

The sequence of operations will now be explained, see Figs. 15, 16 and 17.

With the off-running roll center about on a level with the reel support shaft 15, the reel arms holding the expired butt will be in loading position, see Fig. 15. The butt will now be replaced by a fresh roll. The third roll is now in proper position for preparing for the next splicing operation. The fresh roll will be revolved until a mark (not shown) on the paper roll driving cone 71 appears. In line with this mark, the outside layer of paper will now be cut, preferably in the shape of the letter W. The outside layer will now be smoothed tightly against the roll and will be held in this position by pasting a paster tab on each of the two V points. The paster tab consists of a gummed piece of paper which has been weakened in the center by perforations and is well known to the trade. All along the W shaped edge of the outside layer will now be applied a layer of special paste. The roll is now ready for the pasting operation.

The reel will now be revolved by pushing a control button until the outside surface of the prepared roll is in line with the measuring plate 122, see Fig. 6. This is the correct position for pasting and the reel will be left in this position until the paster has been made. The correct diameter of the roll will now be read on scale 124a and the speed control indicator 144 of the variable speed device will be adjusted accordingly. The off-running butt will now be watched. When the operator decides that the butt is nearing exhaustion he lowers the paster arm 143 into pasting position, which is the extreme inward motion of the arm, Fig. 16. He then lowers the pulley arm 101 bringing the belt drive 121 in contact with the pulley 77 on the end of the paper cone shaft. See Fig. 16. The new roll will now start revolving at a surface speed equal to the speed of paper coming from the butt. When the time comes to make the paster, the operator will push a contact button 259. This will drop the brushes 169 resulting in the paper coming from the butt being pressed against the outside surface of the spinning fresh roll. The paper from the butt will paste to the outside layer of the paper on the roll, the paster tabs on the new roll will break and the two sheets will run together. A moment after the brushes drop the knives 198 will swing into the path of the paper coming from the butt and will sever it. The paper from the new roll will now feed the press. The paster arm 143 will now be raised into inoperative position. The reel will be revolved bringing the next new roll into control of the tension belts 145. (See Fig. 17.) As the reel revolves the cam 142 will interfere with the roll 140 causing the belt arm 101 and the belts 121 to rise into inoperative position. This completes the cycle and the reel is again ready for removing the butt and loading a new paper roll.

In Figs. 18, 19 and 20 is indicated a method whereby the variable speed device 98 could be eliminated from the mechanism as previously described. The pulley 77 on the paper cone shaft 72 would in this case be replaced by an expanding pulley 215, 216 which is arranged as follows: The hub of the pulley consists of two sleeves 213 and 214. These sleeves fit the shaft 72 and are keyed to the same. The outside of the sleeves are threaded, one right hand and the other left hand threads. On these sleeves are mounted two flanges 215 and 216, the inside hole of each flange being threaded to match its respective hub sleeve. The belt face of these flanges has the correct angle to suit a standard V belt 222. At the back of the pulley is located a disc 217 which also is keyed to the spindle shaft 72. In the rim of this disc and parallel with its shaft are located a number of holes 218, which match a spring seated drop pin 219. This pin is spring seated in the flange 216, extends through a hole in the flange 215, and enters one of the holes 218 in the disc 217. The assembly is clamped on the shaft by a washer 220 and screw 221. It will now be understood that the flanges 215 and 216 can be adjusted towards or away from each other as required, by pulling the pin 219 clear of an auxiliary disc 217 and then revolving the flanges on the threaded hub sleeves in the required direction, then locking the flanges again by dropping the pin 219 into one of the holes 218. In adjusting the flanges towards or apart from each other, of course, the running diameter of the V belt 222 on the pulley is changed and consequently the revolutions of the pulley will change with the new diameter. The inside and outside diameter of the faces of the flanges 215 and 216 are predetermined to correspond with the correct speed of the minimum and maximum paper roll required and any intermediate speed can, of course, be obtained by adjusting the flanges.

When placed in the reel the new roll center will be placed in a fixed position in relation to a graduated scale 225 fastened to the spider 65. This measure makes it possible to read the diameter of the new roll by sighting the surface of the roll with the graduations on the rule. On the flange 216 is fastened a graduated scale 226. (See Fig. 20.) This scale is so graduated that by adjusting the flanges so that a certain number of the scale, when in line with inside face of the washer 220, reads the same as the diameter reading on the scale 225, the resulting pulley speed will be correct for that diameter paper roll.

Figures 1, 1A:
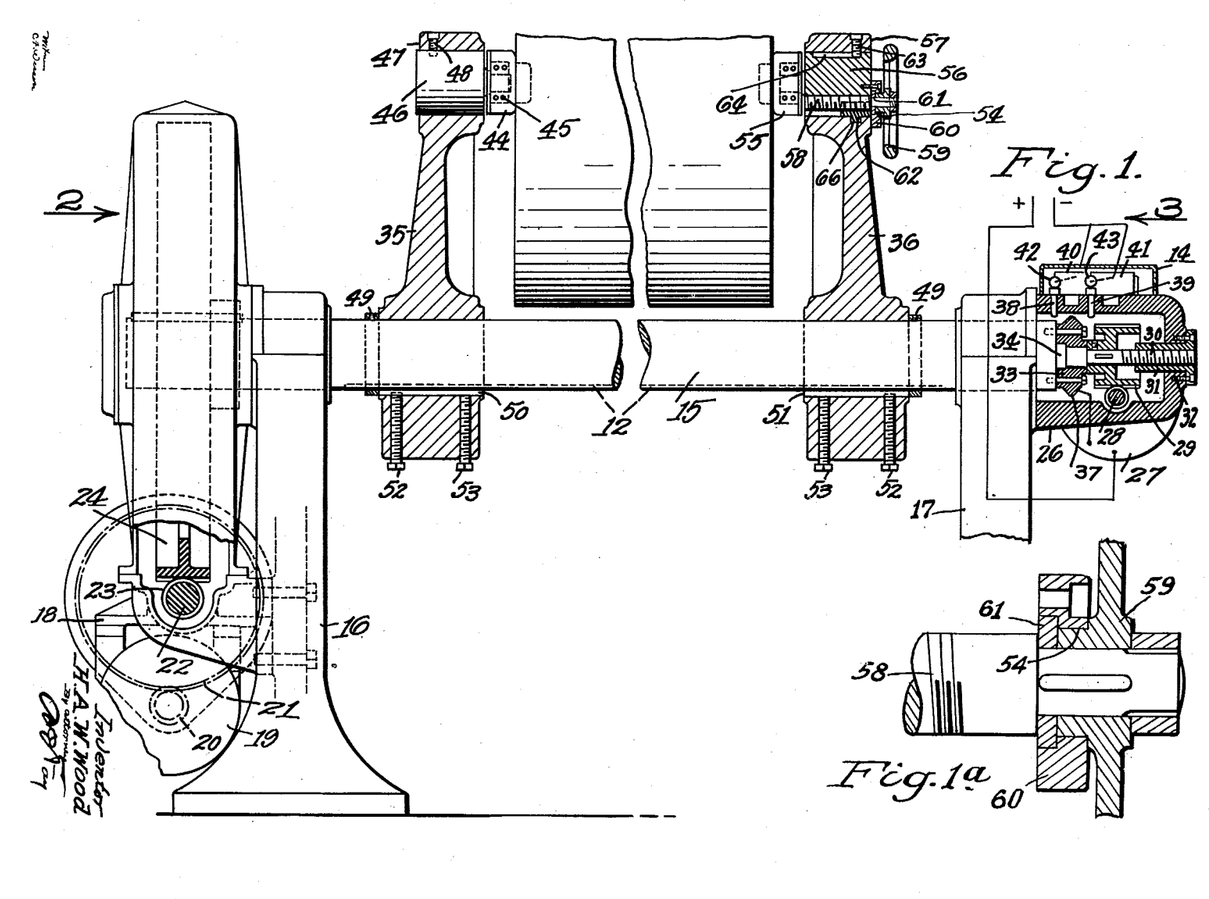
Fig. 1 is a sectional side view of a three-roll reel for use in connection with printing without high speed pasting.
Fig. 1a is a sectional view in detail of the upper part of the right hand bracket shown in Fig. 1.

It will be seen that in Figs. 1, 2, 3 and 4 of this case has been shown a very simple reel, supporting three web rolls, with a motor at one end for the driving of the main shaft and a motor at the other end of said shaft by which said shaft can be adjusted longitudinally, together with automatic means for stopping the second motor at predetermined maximum travel points. These figures also show the mounting of the cones on the two spiders which make up the reel and the way of adjusting and the holding of the adjustment of one of them. They also show the connections of the driving motor with the central shaft by means of a worm which, as explained above, is arranged at an angle to the axis of the main driving gear. Fig. 5 shows how the device can be employed for a full splicing machine by the substitution of a different spider on one side. This spider provides for the supporting of the three cones necessary and by means of a pulley on the shaft of each cone, a driving pulley, and a tightening and loosening pulley, the power can be transmitted to the shaft in action and the fresh web roll. This is done preferably by a plurality of the belts and they are driven positively from the printing press, through a variable speed change device, so that the fresh web roll will be driven in proportion to the speed of the press. The diameter of the fresh web roll is measured, as has been described, and the speed of the drive is changed in accordance with its diameter so that the surface speed of the fresh web roll will be the same as the paper web speed of the press. This is practically all shown in Fig. 5 and the spider shown therein, which is substituted for one of the spiders in Fig. 1, is provided for supporting the three rolls at one end and accomplishing the results just mentioned.

Referring now to Figs. 6 and 7 the method of accomplishing the adjustment of the third pulley and holding it in the proper position to drive the pulley on the shaft 72 is shown. Also the way of releasing this connection by hand is shown as well as the moving yieldingly of the arm which carries the idler pulley so that that pulley will move out of position and the fresh roll will no longer be driven by power but by the pull of the web into the press. Also the cam 142, which has three lobes, because there are three rolls, and its way of operation is shown here. The scale 124a is shown to indicate the way in which this part of the mechanism is set and it cooperates, through the setting by the operator, with the scale 144 to set the variable speed device in proper position.

Figures 16, 17:
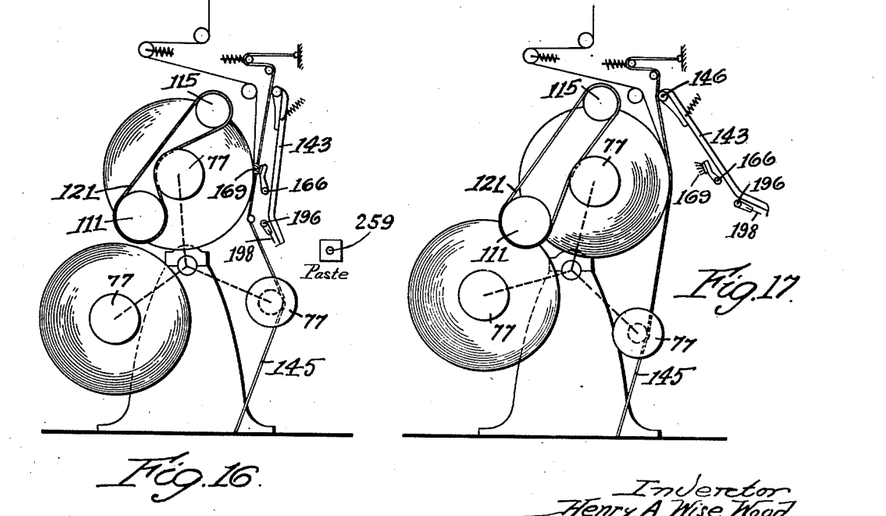
Fig. 16 is an end view of the reel and paster showing them as they are located at the time of splicing.
Fig. 17 is an end view of the reel and paster showing the operation of the mechanism immediately after the paster has been made, the paper now being fed from the new roll.

The method of operation is shown fully in Figs. 15, 16 and 17 and the electrical connections in Fig. 14. The paster arm frame 143 is shown in detail in Fig. 12 and this figure, in cooperation with Figs. 10, 11 and 13, shows the operation of the pasters 169 which are shown as brushes here, their restoration to inoperative position and the way in which they are held in that position, together with the corresponding motion of the knives 198.

In Figs. 18, 19 and 20 a simplification is shown in which the variable speed motion is avoided and the operator has to take advantage of two scales 225 and 226 to secure the proper operation.

Having thus described my invention and the advantages thereof, I do not wish to be limited to the details herein disclosed, otherwise than as set forth in the claims, but what I claim is:

1. The combination with a shaft driven by a printing press, a belt pulley driven positively by said shaft, a cone for supporting and driving a paper roll, a shaft on which said cone is mounted, a pulley on the last named shaft, a belt extending around the two pulleys, a third pulley engaging the belt as a tightener, a pulley arm pivoted on the first named shaft, the third pulley being rotatably mounted on an axis on said arm, a frame for supporting said elements, a curved bar movable on said frame and having ratchet teeth, and a ratchet block on the pulley arm for engaging said ratchet teeth and holding the third pulley in any adjusted position.

2. In a web roll reel, the combination of a pivoted arm, a pulley on said arm, a web roll holding device by which the web roll can be rotated on its axis, a pulley concentric with the web roll for rotating the web roll, a pulley in the plane of said pulley, means for rotating the last named pulley, yielding means for normally holding the arm in such position that its pulley holds the belt out of contact with the second named pulley, a movable rack for holding the arm pulley in operative position, and hand operated means for releasing the rack, thereby allowing the arm to be moved back by the yielding means to normal inoperative position.

3. The combination with a shaft, of a paster frame mounted on said shaft, a stud offset from the shaft, a rod pivoted on said stud and depending therefrom, a shaft carried by said frame, a clutch fixed to the last named shaft and having jaws, a lever pivoted on the shaft and having clutch jaws for cooperating with the first named clutch jaws, said rod being pivotally connected with said lever, whereby, when the frame is swung by hand to inoperative position, a crank action will be developed between the center of the first named shaft and the center of said stud to pull the rod toward the first named shaft, thus turning said lever and eventually turning the second named shaft, to lock the paster frame in inoperative position.

HENRY A. WISE WOOD.